(12) United States Patent
Ni et al.

(10) Patent No.: US 10,883,799 B1
(45) Date of Patent: Jan. 5, 2021

(54) METASURFACE SKIN CLOAK

(71) Applicants: Xingjie Ni, State College, PA (US); Yuan Wang, Alamo, CA (US); Xiang Zhang, Alamo, CA (US)

(72) Inventors: Xingjie Ni, State College, PA (US); Yuan Wang, Alamo, CA (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 1058 days.

(21) Appl. No.: 14/999,918

(22) Filed: Dec. 13, 2016

Related U.S. Application Data

(60) Provisional application No. 62/274,453, filed on Jan. 4, 2016, provisional application No. 62/301,724, filed on Mar. 1, 2016.

(51) Int. Cl.
*H01Q 15/02* (2006.01)
*F41H 3/02* (2006.01)
*H01Q 17/00* (2006.01)

(52) U.S. Cl.
CPC ............. *F41H 3/02* (2013.01); *H01Q 17/005* (2013.01)

(58) Field of Classification Search
CPC ............................... F41H 3/02; H01Q 17/005
USPC ......................................................... 343/909
See application file for complete search history.

(56) References Cited

U.S. PATENT DOCUMENTS

| 9,095,043 B2 | 7/2015 | Boulais et al. |
| 2010/0110559 A1* | 5/2010 | Cai ................. H01Q 17/00 359/642 |
| 2010/0225562 A1* | 9/2010 | Smith ................. G02B 1/007 343/909 |
| 2010/0277381 A1 | 11/2010 | Smolyaninov et al. |
| 2014/0126322 A1 | 5/2014 | Cipolla et al. |
| 2015/0309218 A1 | 10/2015 | Shalaev et al. |
| 2016/0087342 A1* | 3/2016 | Alu .................... H01Q 17/007 342/4 |
| 2019/0170484 A1* | 6/2019 | Kante ................. F41H 3/02 |

OTHER PUBLICATIONS

Ni, X., et al. An ultrathin invisibility skin cloak for visible light. Science 349, 1310 (2015).
J. B. Pendry et al., Controlling electromagnetic fields. Science 312, 1780-1782 (2006).
D. Schurig et al., Metamaterial electromagnetic cloak at microwave frequencies. Science 314, 977-980 (2006).
W. S. Cai et al., Optical cloaking with metamaterials. Nat. Photonics 1, 224-227 (2007).
A. Alu, Mantle cloak: Invisibility induced by a surface. Phys. Rev. B 80, 245115 (2009).
P. Y. Fan et al., An invisible metal-semiconductor photodetector. Nat. Photonics 6, 380-385 (2012).
(Continued)

*Primary Examiner* — Mark Hellner

(57) ABSTRACT

This disclosure provides systems, methods, and devices related to a metasurface skin cloak. In one aspect, a metasurface skin cloak includes a dielectric layer and a plurality of blocks disposed on the dielectric layer. The dielectric layer is disposed over a surface including a feature on the surface. Each block of the plurality of blocks has a shape that is symmetric about two perpendicular axes. The metasurface skin can render the feature on the surface not optically detectable.

20 Claims, 14 Drawing Sheets

(56) References Cited

OTHER PUBLICATIONS

M. Selvanayagam et al., Experimental demonstration of active electromagnetic cloaking. Phys Rev. X 3, 041011 (2013).
J. Li et al., Hiding under the carpet: a new strategy for cloaking. Phys. Rev. Lett. 101, 203901 (2008).
N. Yu et al., Light propagation with phase discontinuities: Generalized laws of reflection and refraction. Science 334, 333-337 (2011).
X. Ni et al., Broadband light bending with plasmonic nanoantennas. Science 335, 427 (2012).
S. Sun et al., Gradient-index meta-surfaces as a bridge linking propagating waves and surface waves. Nat. Mater. 11, 426-431 (2012).
X. Ni et al., Ultra-thin, planar, Babinet-inverted plasmonic metalenses. Light Sci. Appl. 2, e72 (2013).
L. Huang et al., Helicity dependent directional surface plasmon polariton excitation using a metasurface with interfacial phase discontinuity. Light Sci. Appl. 2, e70 (2013).
N. Shitrit et al., Spin-optical metamaterial route to spin-controlled photonics. Science 340, 724-726 (2013).
X. Yin et al., Photonic spin Hall effect at metasurfaces. Science 339, 1405-1407 (2013).
N. Mohammadi Estakhri et al., Ultra-thin unidirectional carpet cloak and wavefront reconstruction with graded metasurfaces. IEEE Antennas Wireless Propag. Lett. 13, 1775-1778 (2015).
L. Y. Hsu et al., Extremely thin dielectric metasurface for carpet cloaking. Prog. Electromagnetics Res. 152, 33-40 (2015).

\* cited by examiner

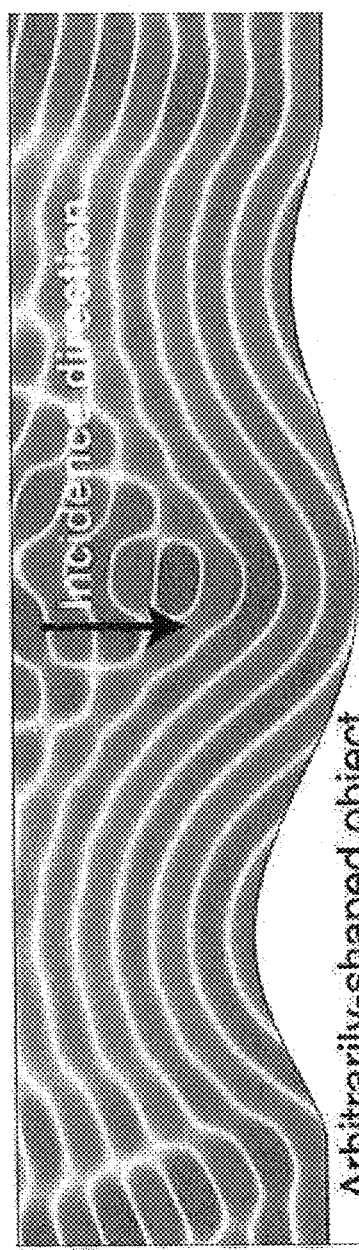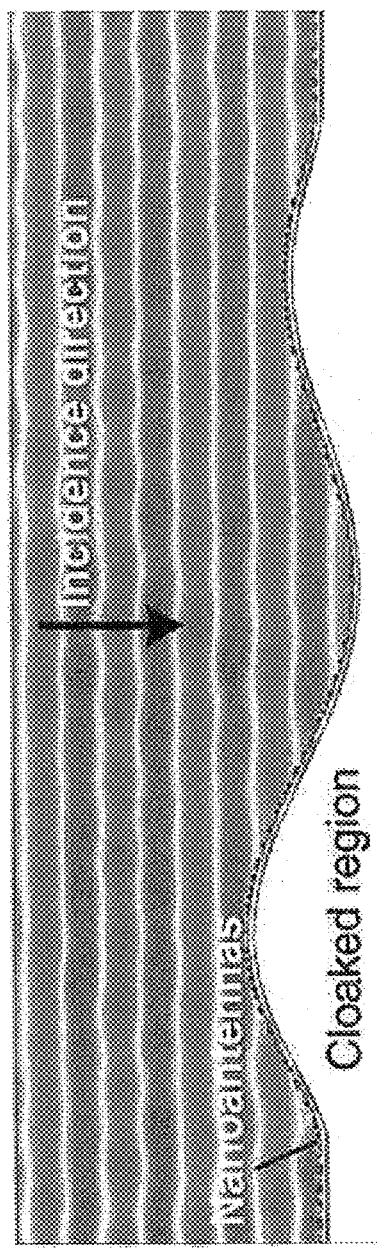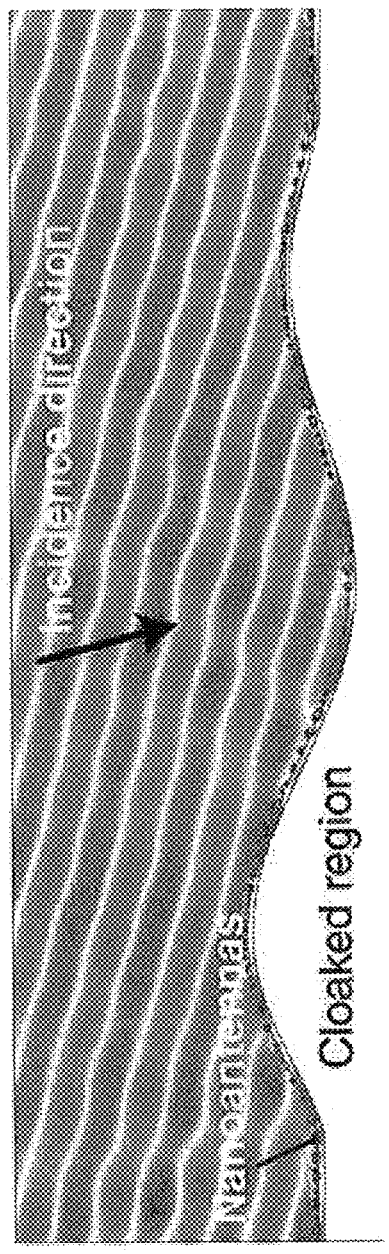

METASURFACE SKIN CLOAK

RELATED APPLICATIONS

This application claims priority to U.S. Provisional Patent Application No. 62/274,453, filed Jan. 4, 2016 and to U.S. Provisional Patent Application No. 62/301,724, filed Mar. 1, 2016, both of which are herein incorporated by reference.

STATEMENT OF GOVERNMENT SUPPORT

This invention was made with government support under Contract No. DE-AC02-05CH11231 awarded by the U.S. Department of Energy and under Grant No. FA9550-12-1-0024 awarded by the Air Force Office of Scientific Research. The government has certain rights in this invention.

TECHNICAL FIELD

This disclosure relates generally to metamaterials and more particularly to a metamaterial-based optical cloak.

BACKGROUND

A cloak is a device that can render objects invisible to incoming waves.

Transformation optics and metamaterials provide powerful tools for building cloaking devices. Different schemes relying either on coordinate transformation or scattering cancellation have been studied. Although the concept of cloaking was first proposed for electromagnetic waves, soon it was extended to acoustic waves, heat flows, elastic or seismic waves, and even the matter waves. A quasi-conformal mapping technique was used to design a so-called carpet cloak that conceals an object by restoring the wavefront as if it were reflected from a flat surface. This technique relaxes the requirements of hard-to-achieve material properties and anisotropy as in the case of the original cloak, thereby making it easier to design and fabricate. Such invisibility carpet cloaks were demonstrated experimentally from microwave to optical frequencies.

There are still substantial limitations in current optical cloak designs that apply the quasi-conformal mapping technique. Realization requires refractive index modulation over a large volume to avoid extremely high or low index, leading to a bulky cloak. In addition, sophisticated three-dimensional (3D) fabrication processes with very high spatial resolution are necessary. Therefore, it is challenging to scale up this design to macroscopic sizes. In addition, the varying index has to be less than that of the environment in certain regions, making it difficult to create a cloak that works in air. As a result, the cloak is usually embedded in a dielectric prism of higher index which, however, introduces an additional phase in the reflected light and makes the optical cloak itself visible by phase-sensitive detection.

SUMMARY

One innovative aspect of the subject matter described in this disclosure can be implemented in a metasurface skin cloak. A metasurface skin cloak can reroute light and restore the wavefront scattered from an object on a surface by compensating for the phase difference using phase-shifting resonant elements on the cloak surface. The phase shift introduced by elements of the metasurface skin cloak should compensate for the phase difference between the light scattered by the object and that reflected from the reference plane. That is, the phase of the scattered light, at each point on the surface of the metasurface skin cloak, should be the same as that of light reflected from a flat surface (e.g., a mirror).

Another innovative aspect of the subject matter described in this disclosure can be implemented in a device including a dielectric layer and a plurality of blocks disposed on the dielectric layer. The dielectric layer is disposed over a surface, with the surface including a feature on the surface. Each block of the plurality of blocks has a shape that is symmetric about two perpendicular axes. A thickness of the dielectric layer and a thickness of the plurality of blocks are specified so that the reflectivity of the surface and the plurality of blocks for electromagnetic radiation is greater than about 85%, with the electromagnetic radiation being a specified range of wavelengths of electromagnetic radiation. The dimensions of each block of the plurality of blocks are specified to have a reflectivity of the electromagnetic radiation that is the same as a reflectivity of the surface that each block of the plurality of blocks is overlying. Dimensions of each block of the plurality of blocks are specified so that each block is operable to introduce a phase shift in the electromagnetic radiation that is reflected from the surface so that the phase of the reflected electromagnetic radiation is the same as if the reflected electromagnetic radiation were reflected from a flat surface not including the feature.

In some implementations, each block of the plurality of blocks has dimensions selected from a set of three of more dimensions. In some implementations, the shape of each block of the plurality of blocks is selected from a group consisting of a square, a rectangle, a circle, and an ellipse. In some implementations, the shape of each block of the plurality of blocks is selected from a group consisting of a square and a rectangle, and the square or rectangle has a length of about 10 nanometers to 300 nanometers and a width of about 10 nanometers to 300 nanometers.

In some implementations, the dielectric layer comprises a dielectric selected from a group consisting of $MgF_2$, $SiO_2$, $GeO_2$, $Al_2O_3$, $TiO_2$, $HfO_2$, $TeO_2$, and $Si_3N_4$. In some implementations, the dielectric layer is about 10 nanometers to 100 nanometers thick.

In some implementations, the plurality of blocks comprises a material selected from a group consisting of gold, silver, and aluminum. In some implementations, each block of the plurality of blocks is about 10 nanometers to 80 nanometers thick. In some implementations, a thickness of each block of the plurality of blocks is the same for each block of the plurality of blocks. In some implementations, each block of the plurality of blocks has a spacing of at least about 60 nanometers from each other block of the plurality of blocks.

In some implementations, a reflective layer is disposed on the surface, with the dielectric layer disposed on the reflective layer. In some implementations, the reflective layer comprises a material selected from a group consisting of gold, silver, aluminum, titanium, and chromium. In some implementations, the reflective layer is at least about 50 nanometers thick.

Another innovative aspect of the subject matter described in this disclosure can be implemented in a method including: (a) measuring a two dimensional height profile of a surface, the surface including a feature; (b) determining a thickness of a dielectric layer and a thickness of a plurality of blocks disposed thereon so that the surface with the plurality of blocks disposed thereon has a reflectivity of at least about 85% for electromagnetic radiation, the electromagnetic radiation being a specified range of wavelengths of electromagnetic radiation; (c) determining dimensions of each block of the plurality of blocks needed to introduce a phase shift in the electromagnetic radiation that is reflected from the surface so that the phase of the reflected electromagnetic radiation is the same as if the reflected electromagnetic radiation were reflected from a flat surface not including the feature; (d) determining the dimensions of each block of the plurality of blocks needed to have a reflectivity of the electromagnetic radiation that is the same as a reflectivity of the surface that each block of the plurality of blocks is overlying so that the reflected electromagnetic radiation has the same amplitude; (e) depositing the dielectric layer over the surface having the thickness determined in operation (b); (f) depositing a material having a thickness determined in operation (b) on the dielectric layer; and (g) removing portions of the material to form the plurality of blocks having the dimensions determined in operation (c) and (d), each block of the plurality of blocks having a shape that is symmetric about two perpendicular axes.

In some implementations, prior to operation (a), a reflective layer is deposited on the surface.

Another innovative aspect of the subject matter described in this disclosure can be implemented in a method including: (a) measuring a two dimensional height profile of a surface, the surface including a feature; (b) determining a thickness of a dielectric layer and a thickness of a plurality of blocks disposed thereon so that the surface with the plurality of blocks disposed thereon has a reflectivity of at least about 85% for electromagnetic radiation, the electromagnetic radiation being a specified range of wavelengths of electromagnetic radiation; (c) determining dimensions of each block of the plurality of blocks needed to introduce a phase shift in the electromagnetic radiation that is reflected from the surface so that the phase of the reflected electromagnetic radiation is the same as if the reflected electromagnetic radiation were reflected from a flat surface not including the feature; (d) determining the dimensions of each block of the plurality of blocks needed to have a reflectivity of the electromagnetic radiation that is the same as a reflectivity of the surface that each block of the plurality of blocks is overlying so that the reflected electromagnetic radiation has the same amplitude; (e) depositing the dielectric layer having the thickness determined in operation (b) over the surface; and (f) forming the plurality of blocks on the dielectric layer, the plurality of blocks having the thickness determined in operation (b), each block of the plurality of blocks having dimensions as determined in operations (c) and (d), each block of the plurality of blocks having a shape that is symmetric about two perpendicular axes.

In some implementations, prior to operation (a), a reflective layer is deposited on the surface.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 6A-6C show full-wave simulated scattered electrical field distribution (shown for a cross section) of an object with and without a metasurface skin cloak.

DETAILED DESCRIPTION

Figure 1:
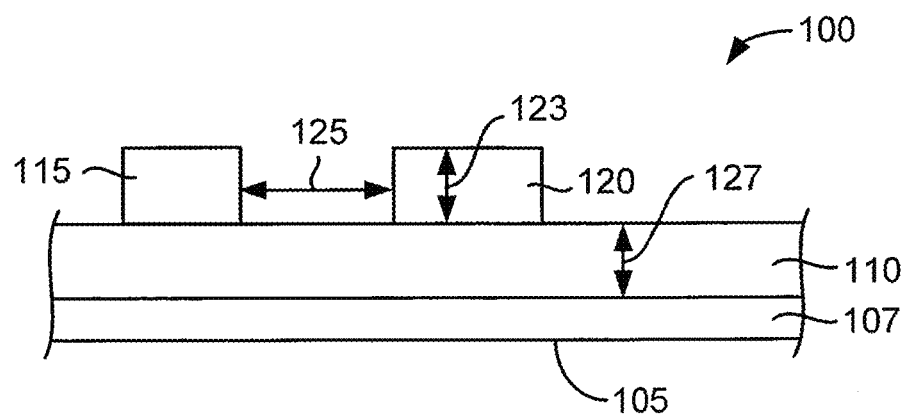
FIG. 1 shows an example of a cross-sectional illustration of two blocks of a metasurface skin cloak.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Metasurface Skin Cloak

A metasurface is an optically thin layer comprising sub-wavelength-sized elements that locally tailor the electromagnetic response at the nanoscale, accompanied by dramatic light confinement. Metasurfaces have enabled a variety of unique phenomena and applications that cannot be achieved conventionally—for example, negative-angle refraction in a broad wavelength range, unidirectional surface wave coupling, planar optical lenses and waveplates, ultrathin high-resolution holograms, and enhancement of nonlinear optical responses. Recent development of metasurfaces enable a way to manipulate the phase of a propagating wave directly.

A metasurface skin cloak and methods of fabrication thereof are described herein. A metasurface is a surface that is able to manipulate light at a sub-wavelength scale (i.e., a wavelength below the wavelength of the light). In some embodiments, a metasurface is a fabricated surface comprising thin subwavelength elements which can change the light properties (e.g., phase, amplitude, polarization, etc.) through resonances.

A metasurface skin cloak can overcome limitations of a bulky cloak. A metasurface skin cloak disposed on an object can render the object free from optical detection. In contrast to the previous bulky design using continuous refractive index distribution over a volumetric space, the metasurface skin cloak reroutes the light and restores the wavefront scattered from the object by compensating for the phase difference using phase-shifting resonant elements on the cloak surface. With the complete wavefront and phase recovery, a 3D object of arbitrary shape may be concealed using a metasurface skin cloak.

The metasurface skin cloak disclosed herein comprises subwavelength-scale blocks or nanoantennas and a dielectric layer which provide distinct phase shifts locally to the scattered electromagnetic waves. On the basis of this phase control capability, the metasurface skin cloak can be designed so that the phase of the scattered light, at each point on the surface of the cloak, would be the same as that of light reflected from a flat mirror. For an oblique-angle ($\theta$, $\varphi$) light incident on an arbitrarily shaped 3D object at a height of h with respect to the reference plane (see FIG. 4B), the introduced phase shift should compensate the phase difference between the light scattered by the object and that reflected from the reference plane. The phase difference, which is $\Delta\Phi=-2k_0 h \cos\theta+\pi$, where $k_0$ is the free space wave number, can be calculated. The additional $\pi$ term represents the phase jump induced by a reflecting mirror. Therefore, nanoantennas designed with local $\Delta\Phi$ phase shift should realign the scattered wavefront. Moreover, the phase should be completely restored, rendering the object undetectable even for phase-sensitive instruments.

In some embodiments, a metasurface skin cloak comprises a dielectric layer disposed on a surface and a plurality of blocks disposed thereon. In some embodiments, a metasurface skin cloak further comprises a reflective layer disposed on the surface with the dielectric layer being disposed on the reflective layer.

Figure 2A:
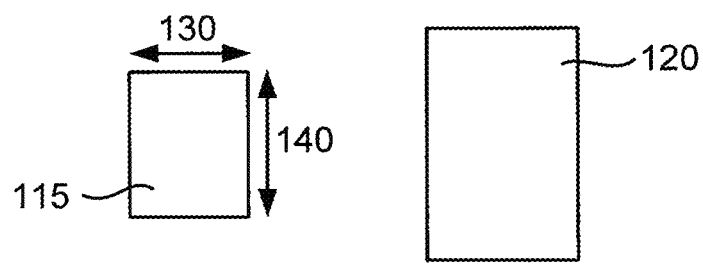
FIG. 2A shows an example of a top-down view of two blocks of a metasurface skin cloak.

FIG. 1 shows an example of a cross-sectional illustration of two blocks of a metasurface skin cloak. FIG. 2A shows an example of a top-down view of the two blocks. In some embodiments, the metasurface skin cloak can conceal an object on which metasurface skin cloak is disposed for specified wavelengths or a specified range of wavelengths of electromagnetic radiation, including visible light. For example, the object may be a bump, depression, or other feature on an otherwise flat surface.

As shown in FIG. 1, a metasurface skin cloak 100 includes a reflective layer 107 disposed on a surface 105, a dielectric layer 110 disposed on the reflective layer 107, and blocks 115 and 120 disposed on the dielectric layer 110. The blocks 115 and 120 correspond to nanoantennas.

As shown in FIG. 1, the reflective layer 107 is disposed on the entire area of the surface 105. In some embodiments, the reflective layer 107 is at least about 50 nanometers thick. In some embodiments, the reflective layer 107 is about 50 nanometers to 200 nanometers thick, or about 150 nanometers thick. In some embodiments, the reflective layer 107 comprises a metal selected from a group consisting of gold, silver, aluminum, titanium, and chromium.

In some embodiments, when the surface 105 is reflective, the metasurface skin cloak does not include a reflective layer 107 and the dielectric layer 110 is disposed on the surface 105. In some embodiments, the reflectivity of the surface 105 and the dielectric layer 110 with a plurality of blocks disposed thereon or the reflectively of the reflective layer 107 and the dielectric layer 110 with a plurality of blocks disposed thereon is about 85% or greater.

In some embodiments, the dielectric layer 110 comprises a dielectric material or a transparent dielectric material. In some embodiments, the dielectric layer 110 comprises an oxide or a nitride. In some embodiments, the dielectric layer 110 comprises a dielectric selected from a group comprising magnesium fluoride ($MgF_2$), silicon dioxide ($SiO_2$), germanium dioxide ($GeO_2$), aluminum oxide ($Al_2O_3$), titanium dioxide ($TiO_2$), hafnium oxide ($HfO_2$), tellurium dioxide ($TeO_2$), and silicon nitride ($Si_3N_4$). In some embodiments, the dielectric layer 110 is about 10 nanometers (nm) to 100 nm thick, or about 50 nm thick.

In some embodiments, the blocks 115 and 120 comprise a metal selected from a group consisting of gold, silver, and aluminum. In some embodiments, the blocks 115 and 120 are about 10 nanometers to 80 nanometers thick 123, or about 30 nm thick 123.

In some embodiments, the blocks comprise a high refractive index material. Examples of high refractive index materials include silicon (Si), titanium dioxide ($TiO_2$), hafnium oxide ($HfO_2$), and tellurium dioxide ($TeO_2$). A property that the blocks need to have is that they need to be resonant. A block comprising a high refractive index material may have Mie resonances.

Figure 2B:
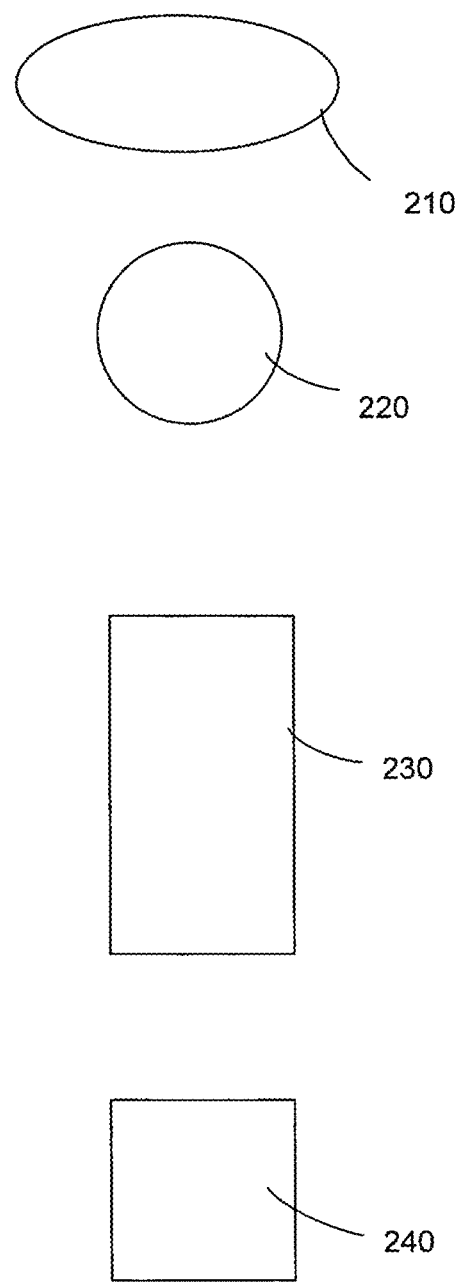
FIG. 2B shows an example of a top-down view of different shapes that blocks may have.

As shown in FIG. 2A, the block 115 and 120 have a shape of a rectangle. That is, the blocks 115 and 120 have a shape of a rectangle as it is disposed on the dielectric layer 110. A block may have other shapes. In some embodiments, the shape of the block is symmetric about two perpendicular axes. As shown in FIG. 2B, in some embodiments, a block has a shape of an ellipse 210, a circle 220, a rectangle 230, or a square 240. The block 105 has a length 130 and a width 140. In some embodiments, the length 130 is about 10 nm to 300 nm, or about 40 nm to 100 nm. In some embodiments, the width 140 is about 10 nm to 300 nm, or about 40 nm to 100 nm. When a block has an elliptical cross-section, the major axis may have a length of about 10 nm to 300 nm, or about 40 nm to 100 nm, and the minor axis may have a length of about 10 nm to 300 nm, or about 40 nm to 100 nm. In some embodiments, each block of the plurality of blocks has a spacing 125 of at least about 60 nm, or about 60 nm to 200 nm from each other block of the plurality of blocks.

In some embodiments, each block of the plurality of blocks has dimensions selected from a group of three or more sets of dimensions. In some embodiments, each block of the plurality of blocks has dimensions selected from a group of three sets of dimensions to twenty sets of dimensions. For example, a first set of dimensions would include a first length and a first width, a second set of dimensions would include a second length and a second width, a third set of dimensions would include a third length and a third width, and so on. When each block of the plurality of blocks has dimensions selected from a group of three sets of dimensions, for example, all of the blocks of the plurality of blocks have a first length and a first width, a second length and a second width, or a third length and a third width. Blocks having these three different sets of dimensions would be disposed on the dielectric layer 110.

A metasurface skin cloak functions by changing electromagnetic radiation (e.g., light waves) reflected from a surface having a feature (e.g., a bump, a depression, or an object disposed thereon) therein to be concealed or rendered invisible by the metasurface skin cloak by eliminating traces that the feature would otherwise leave in the reflected electromagnetic radiation. That is, the metasurface skin cloak counteracts distortions in the light waves that are reflected from an object on a surface so that reflected waves remain straight, as if reflected by the surface underlying the object. To accomplish this, each block of the plurality of blocks resonates with the incoming wave. A block shifts the phase of the scattered wave (depending on the dimensions of the block) relative to those of an incoming wave due to its resonance. By specifying dimensions of each block of the plurality of blocks, the blocks may radiate in concert to produce the undistorted wave fronts.

A thickness 127 of the dielectric layer 110 and a thickness 123 the blocks of the plurality of blocks are specified so that the reflectivity of the surface 105 and the plurality of blocks for electromagnetic radiation is greater than about 85%. The electromagnetic radiation is a specified range of wavelengths of electromagnetic radiation. Dimensions of each block of the plurality of blocks are specified to have a reflectivity of the electromagnetic radiation that is the same as a reflectivity of the surface that each block of the plurality of blocks is overlying. Dimensions of each of the block of the plurality of blocks are also specified so that each block is operable to introduce a phase shift in the electromagnetic radiation that is reflected from the surface so that the phase of the reflected electromagnetic radiation is the same as if the reflected electromagnetic radiation were reflected from a flat surface not including the object disposed thereon.

Method

Figure 3A:
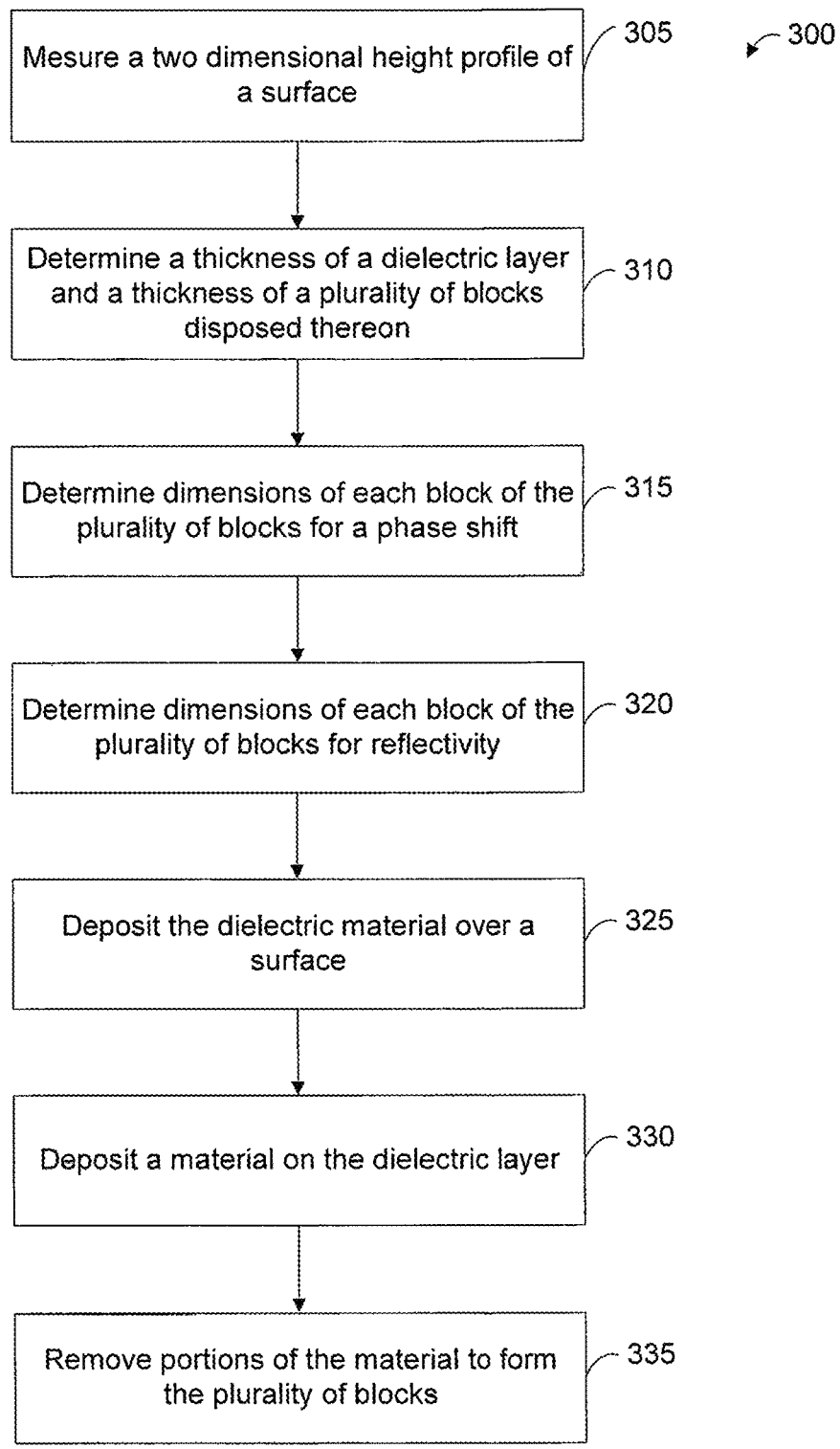
FIGS. 3A and 3B show examples of flow diagrams illustrating manufacturing processes for a metasurface skin cloak.

FIG. 3A shows an example of a flow diagram illustrating a manufacturing process for a metasurface skin cloak. Patterning techniques, including masking as well as etching processes, may be used to define the blocks of the metasurface skin cloak. For example, photolithography or electron beam lithography may be used.

Starting at block 305 of the method 300, a two dimensional height profile of a surface to be cloaked is measured. This generates a data set that includes the height (e.g., h) at each length (e.g., x) and width (e.g., y) position of the surface. For example, the two dimensional height profile of the surface may be measured with atomic force microscopy (AFM). Using this two dimensional height profile, a distribution of the blocks can be determined at each local position (i.e., x and y position) on the surface. That is, the two dimensional height profile is used to determine a specific block (e.g., a block selected from a group of three or more sets of block dimensions) to be placed at a local position (i.e., x and y position) on the surface. In some embodiments, the surface includes a feature. For example, the feature may be a bump on the surface, a depression in the surface, or an object disposed on the surface.

At block 310 a thickness of a dielectric layer and a thickness of a plurality of blocks disposed thereon is determined so that the surface with the plurality of blocks disposed thereon so has a reflectivity of at least about 85% for electromagnetic radiation. The electromagnetic radiation is a specified range of wavelengths of electromagnetic radiation.

At block 315 dimensions of each block of the plurality of blocks are determined for a phase shift. Each block of the plurality of blocks has dimensions needed to introduce a phase shift in the electromagnetic radiation that is reflected from the surface so that the phase of the reflected electromagnetic radiation is the same as if the reflected electromagnetic radiation were reflected from a flat surface not including the feature.

At block 320, the dimensions of each block of the plurality of blocks are determined for reflectivity. Each block of the plurality of blocks has dimensions needed to have a reflectivity of the electromagnetic radiation that is the same as a reflectivity of the surface that each block of the plurality of blocks is overlying; that is, the electromagnetic radiation reflected from a block should have the same amplitude as the electromagnetic radiation reflected from the surface that does not include the feature.

At blocks 315 and 320, a number of different sets of dimensions of the blocks are specified so that the sets of dimensions span a range of phase shifts from 0 to $2\pi$ while having the same reflectivity (i.e., all the blocks having the same dimensions have the same reflectivity). In some embodiments, determining the dimensions of each block of the plurality blocks is an iterative process between blocks 315 and 320.

At block 325, the dielectric layer having the thickness determined at block 310 is deposited over the surface. The dielectric layer may be deposited with a number of different deposition techniques, including e-beam evaporation, atomic layer deposition (ALD), and chemical vapor deposition (CVD).

At block 330, a material having a thickness determined at block 310 is deposited on the dielectric layer. The material may be deposited with a number of different deposition techniques, including e-beam evaporation, ALD, and CVD.

At block 335, portions of the material are removed to form the plurality of blocks having the dimensions determined at blocks 315 and 320. For example, lithography techniques could be used to define the plurality of the blocks and etchants could be used to remove the portions of the material. Each block of the plurality of blocks has a shape that is symmetric about two perpendicular axes.

In some embodiments, when the surface is not a reflective surface, prior to block 305, a reflective layer is deposited on the surface. The reflective layer may be deposited with a number of different deposition techniques, including e-beam evaporation, ALD, and CVD. In some embodiments, the dielectric layer is deposited on the reflective layer.

Figure 3B:
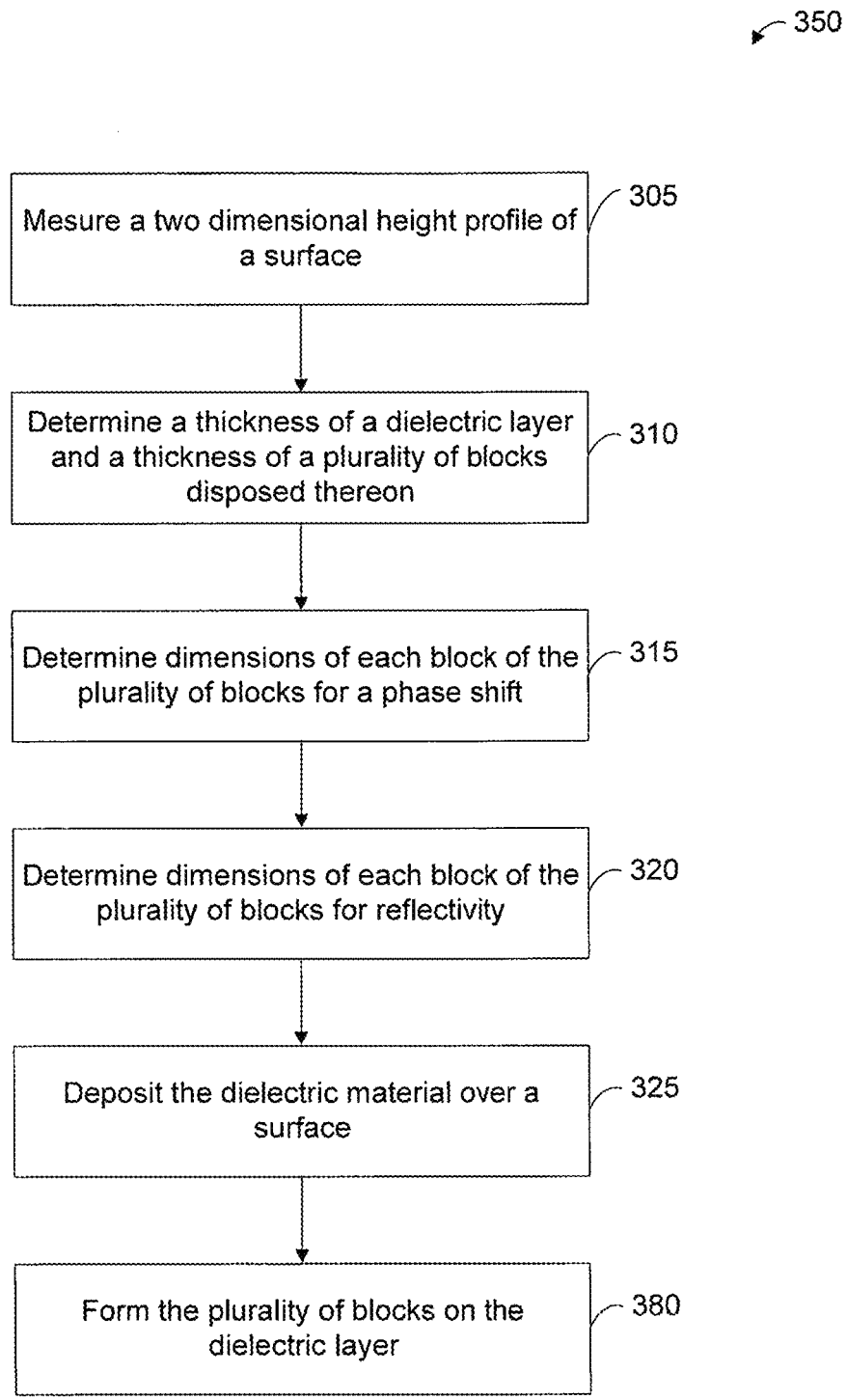

FIG. 3B shows an example of a flow diagram illustrating a manufacturing process for a metasurface skin cloak. Blocks 305, 310, 315, 320, and 325 in the method 350 are the same as described above with respect to the method 300 shown at FIG. 3A.

At block 380, the plurality of blocks is formed on the dielectric layer. The plurality of blocks have the thickness determined at block 310. Each block of the plurality of blocks has dimensions as determined at blocks 315 and 320. For example, lithography techniques and a mask material could be used to define the areas of the dielectric layer on which the blocks are to be formed. The blocks could be deposited using any number of deposition techniques, including e-beam evaporation, ALD, and CVD. After deposition of the blocks, the mask material could then be removed. Each block of the plurality of blocks having a shape that is symmetric about two perpendicular axes.

In some embodiments, when the surface is not a reflective surface, prior to block 305, a reflective layer is deposited on the surface. The reflective layer may be deposited with a number of different deposition techniques, including e-beam evaporation, ALD, and CVD. In some embodiments, the dielectric layer is deposited on the reflective layer.

Theoretically, there is no size limitation to a metasurface skin cloak. In practice, however, the size may be limited by the macroscopic nanofabrication technology. Meter-scale nanofabrication is now possible, which may be used to make large metasurface skin cloaks. For example, roll-to-roll nano-imprinting processes and soft lithography processes may be used to make metasurface skin cloaks. Elastic/deformable self-adjusting cloaks may also be fabricated in the future. For example, depending on the size of the metasurface skin cloak, the plurality of blocks of the metasurface skin cloak may include at least about one hundred, one thousand, one million, one hundred million, or more blocks.

The cloak can also conceal objects with sharp features like abrupt edges and peaks because the invisibility is attained via local phase adjustments. Note that it is not a requirement to place the nanoantennas and dielectric layers or blocks directly on the object. The metasurface can be on a container of any shape, with or without space between the metasurface and the hidden object. As long as the metasurface is designed correctly, both the container and the objects inside the container will become invisible.

Experimental Demonstration of Metasurface Skin Cloak

The following example is intended to be an example of the embodiments disclosed herein, and is not intended to be limiting.

Figure 4A:
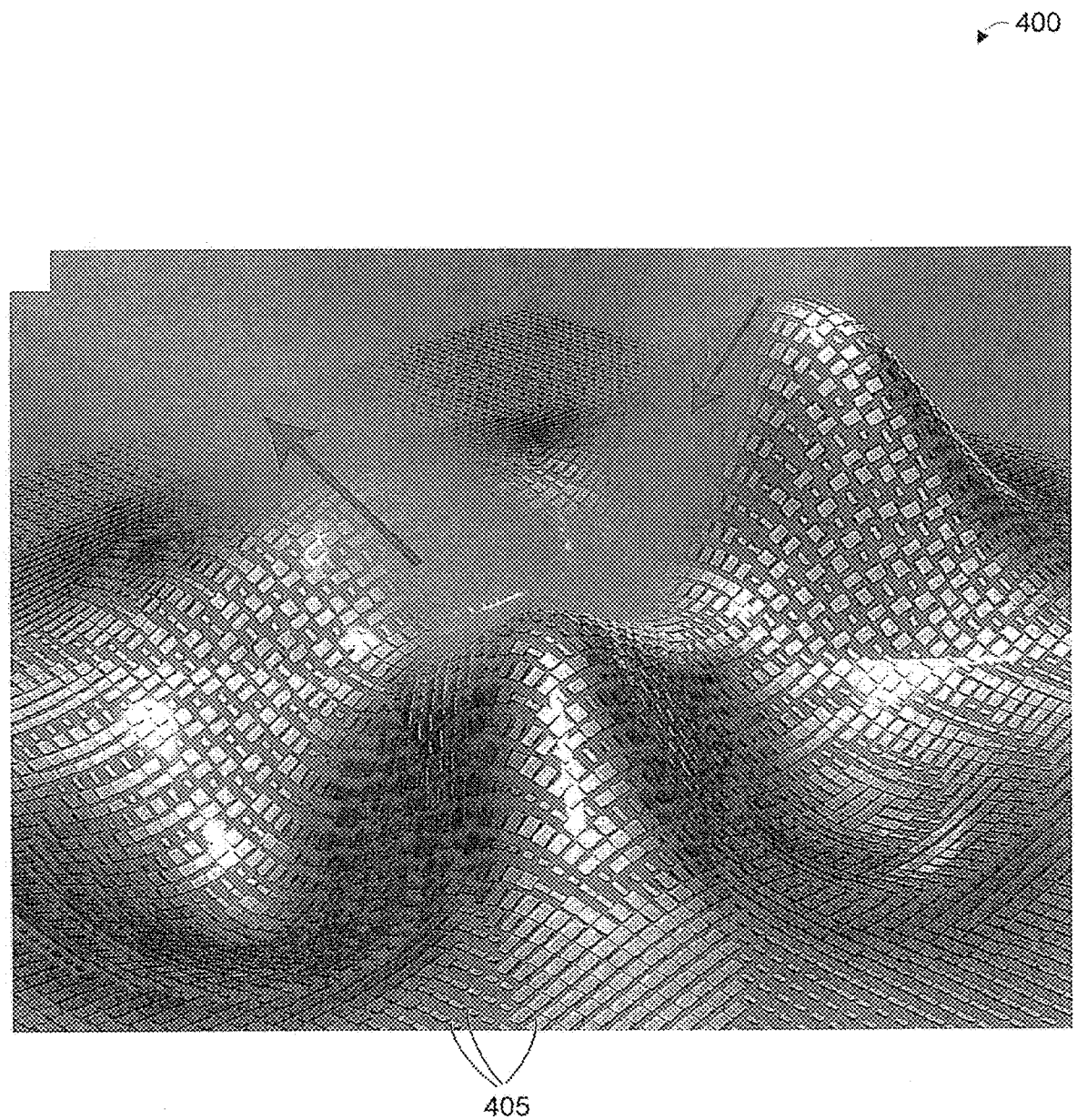
FIG. 4A shows an example of an isometric illustration of a metasurface skin cloak disposed on a surface to be concealed.
Figure 4B:
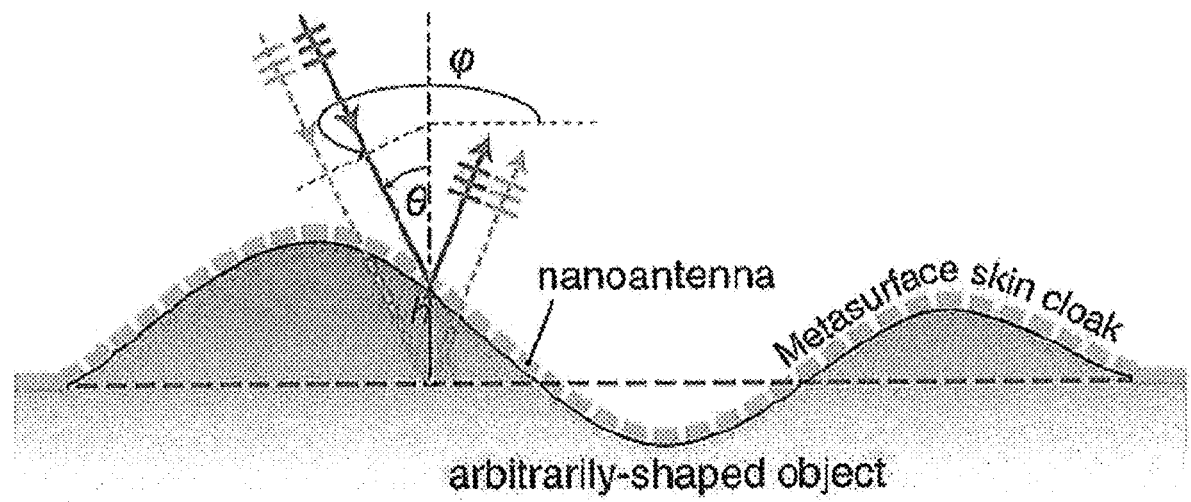
FIG. 4B shows an example of a cross-sectional schematic illustration of a metasurface skin cloak.
Figure 4C:
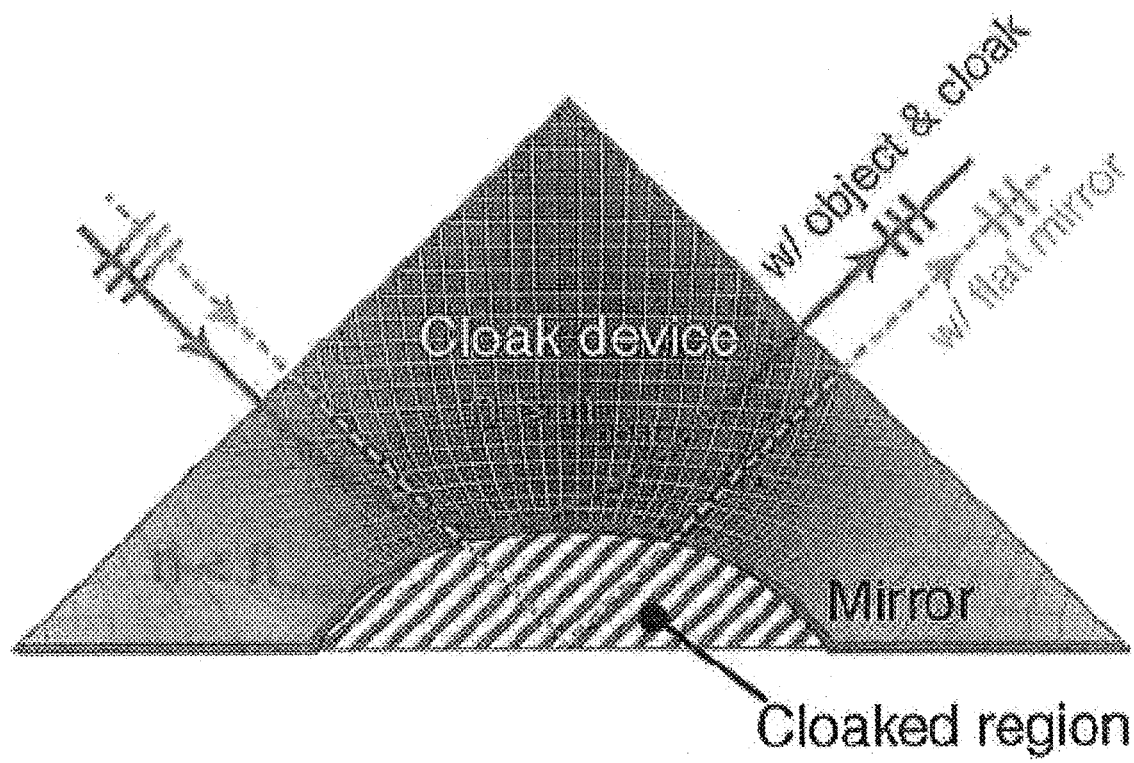
FIG. 4C shows an example of a cross-sectional schematic illustration of a conventional carpet cloak with spatially varying refractive index (n), designed with an optical quasi-conformal mapping technique.

FIG. 4A shows an example of an isometric illustration of a metasurface skin cloak disposed on a surface to be concealed. The metasurface skin cloak 400 includes a plurality of blocks or nanoantennas 405 disposed on a surface to be concealed. FIG. 4B shows an example of a cross-sectional schematic illustration of a metasurface skin cloak. FIG. 4C shows an example of a cross-sectional schematic illustration of a conventional carpet cloak with spatially varying refractive index (n), designed with an optical quasi-conformal mapping technique. For both cloaks shown in FIGS. 4B and 4C, light is incident from the left and exits to the right as represented by the arrows. Both cloaks recover the wave front (indicated as triple short lines) of the exiting light, such that the object is hidden and looks like a flat mirror, judging from the scattering pattern of the exiting light. However, the conventional cloak introduces additional phase retardation due to the light propagation inside its host material, which renders it detectable to a phase-sensitive measuring device. In contrast, the metasurface skin cloak fully restores both the wavefront and the phase of the scattered light, and thus the object is hidden from phase-sensitive measuring devices.

On the metasurface skin cloak, a phase shift provided by each nanoantenna realigns the wavefront. At an arbitrary point on the object with height h to the flat reference plane, the nanoantenna should recover the phase of the scattered light. Light (solid lines) incident at an oblique angle $(\theta, \varphi)$ at that point should scatter as if it were reflected by the reference plane (dashed lines). The nanoantenna at that point should provide a phase shift $\Delta\Phi=-2k_0 h \cos\theta+\pi$, which compensates the phase difference between the solid and dashed lines. Note that the height is negative when the surface is below the reference plane.

A 3D object of arbitrary shape using a metasurface skin cloak was able to be concealed for a specific light polarization. The device had a thickness of 80 nm (~λ/9) and, being two-dimensional had good scalability prospects. Experiments showed that the metasurface skin cloak was able to hide an arbitrarily shaped 3D object of 36 microns by 36 microns at an approximately 730 nm wavelength, both from direct widefield imaging and phase-sensitive detection.

A rectangular nanoantenna design was used for these experiments. The calculated phase shifts and reflectance in a 2D parameter space spanned by nanoantenna dimensions $l_x$ and $l_y$ was mapped out for the selection of designs. Six different antennas with phase shifts covering 0 to $2\pi$ while preserving the same reflectance were chosen as components of the metasurface skin cloak. Making the metasurface skin cloak operable required the reflected intensity to be close to that of a mirror. With adaptation of a thin dielectric spacer layer to create a gap plasmon resonance, the nanoantennas were designed to attain an overall reflectivity of 84% at about a 730 nm wavelength.

Figure 5A:
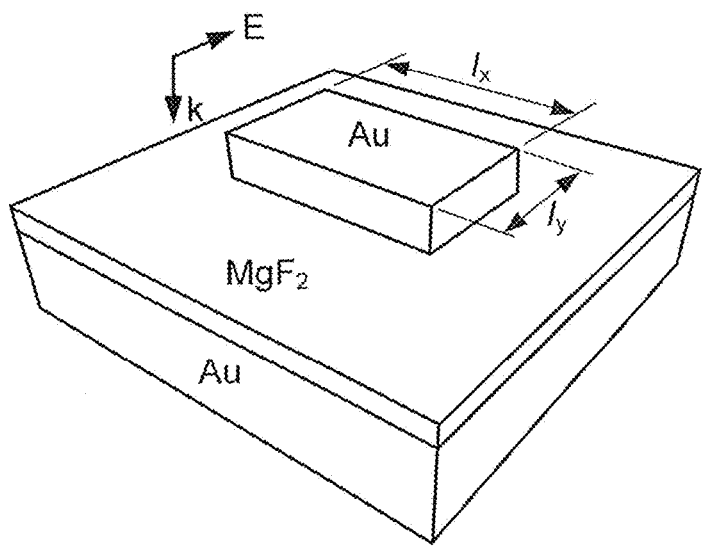
FIG. 5A shows an example of an isometric illustration of a nanoantenna and used to build a metasurface skin cloak.
Figure 5B:
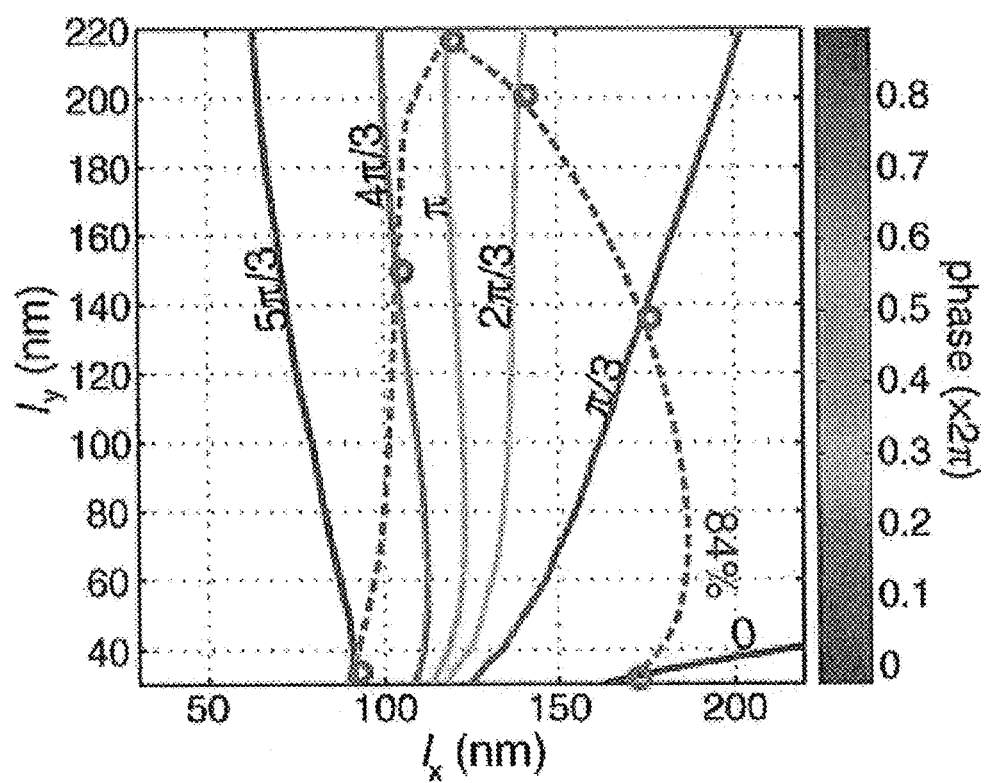
FIG. 5B shows the calculated phase shifts and reflectance in a 2D parameter space spanned by $l_x$ (i.e., the length of a nanoantenna) and $l_y$ (i.e., the width of a nanoantenna).

FIG. 5A shows an example of an isometric illustration of a nanoantenna used to build the metasurface skin cloak. FIG. 5B shows the calculated phase shifts and reflectance in a 2D parameter space spanned by $l_x$ (e.g., the length of a nanoantenna) and $l_y$ (e.g., the width of a nanoantenna). The solid lines are the contour lines of the phase shift and the dashed line is the contour line of the reflectance at 84%. For simplicity, six different nanoantennas, which span the phase from 0 to $2\pi$ with an interval of $\pi/3$, were chosen as the building blocks to construct the metasurface, as shown by the six circles intersecting the phase and the 84%-reflectance contour lines. The six nanoantennas had the following dimensions: $(l_x, l_y)=$(91 nm, 32 nm), (103 nm, 150 nm), (118 nm, 218 nm), (138 nm, 200 nm), (172 nm, 138 nm), and (167 nm, 31 nm). A metasurface skin cloak using these nanoantennas was fabricated to compensate the local phase change of the reflection.

Figure 5C:
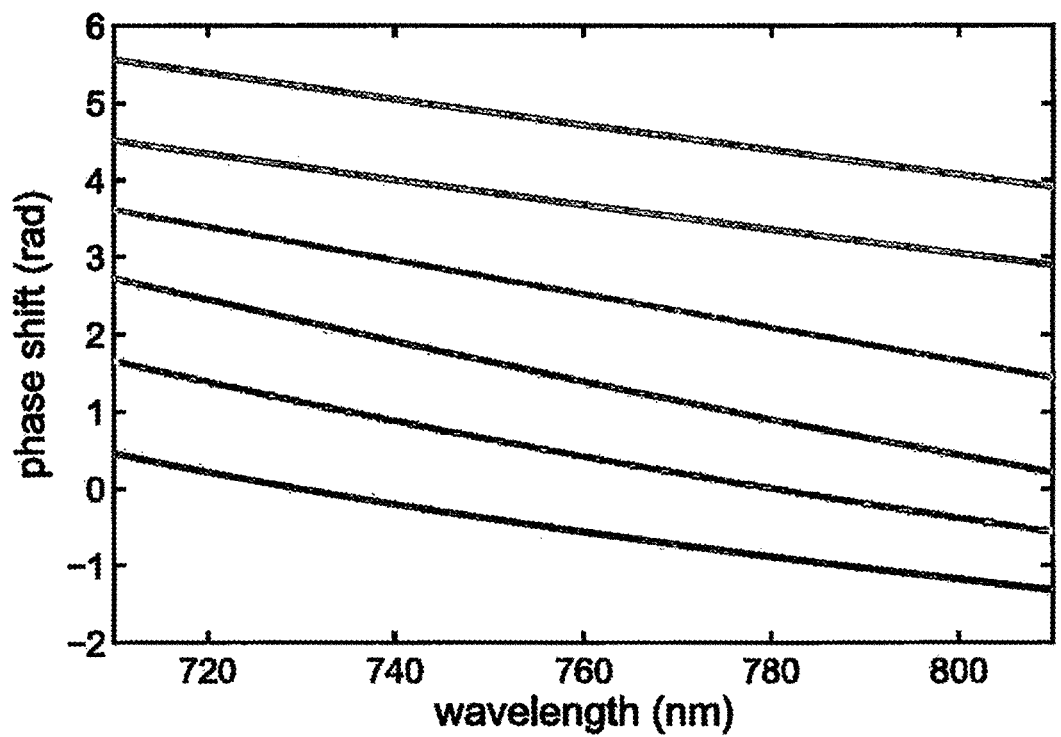
FIG. 5C shows the spectral response of each of the six nanoantennas

FIG. 5C shows the phase shift provided by the nanoantennas versus the wavelength. Each line indicates the response for each nanoantenna design. From bottom to top, the lines corresponding to the nanoantennas with phase shifts of 0, $\pi/3$, ..., $\pi5/3$ at 730 nm. Despite the wavelength change, the (phase shift) separation between each neighboring lines is still approximately the same, with the six nanoantennas roughly covering a $2\pi$ phase range. However, the curves are not flat over all the wavelength range—a shorter wavelength has a smaller absolute phase shift. Additionally, the required phase shift is also wavelength-dependent as indicated by $\Delta\Phi=-2k_0 h \cos\theta+\pi$. Therefore, the performance of the skin cloak gets worse when the wavelength moves away from the designed one.

FIGS. 6A-6C show full-wave simulated electrical field distribution (shown for a cross section) of an object with and without a metasurface skin cloak. In these figures, for clarity, only the reflected field is plotted. The wavelength of the incident light was 730 nm in the simulations. FIG. 6A shows that strong scattering and substantial wavefront and phase distortion can occur at normal incidence for an arbitrarily shaped 3D object with a maximum height of about 1 μm and a width of about 10 μm. FIG. 6B shows that the same object at normal incidence after wrapping the object with the metasurface skin cloak. The wavefront and phase are completely restored. FIG. 6C shows that the same object at a slightly oblique incidence (i.e., about 15°) after wrapping the object with the metasurface skin cloak. The wavefront and phase are completely restored. Therefore, the object is perfectly hidden even from phase-sensitive detection.

Figure 7A:
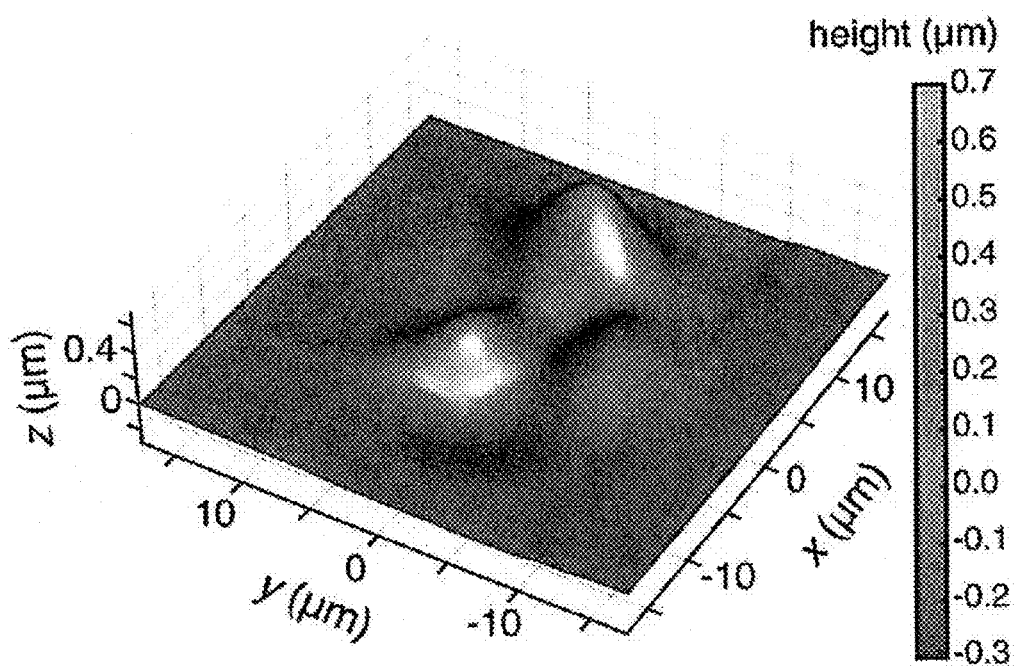
FIG. 7A shows an AFM image of the arbitrarily shaped 3D object that includes multiple bumps and dents.
Figure 7B:
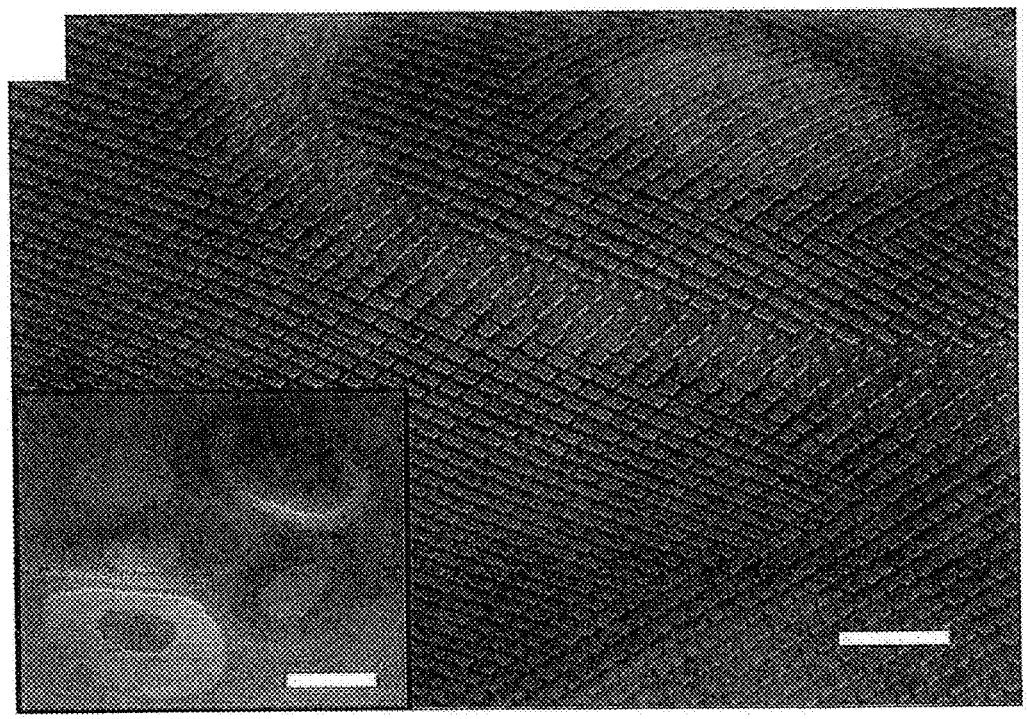
FIG. 7B shows SEM images of the object on which a metasurface skin cloak has been fabricated.

For experimental realization of a metasurface skin cloak, a focused ion beam (FIB) was used to form an arbitrarily shaped 3D object with multiple bumps and dents. The height profile of the 3D object was mapped out by an atomic force microscope (AFM), and the metasurface skin cloak was then designed on the basis of this measured height profile. FIG. 7A shows an AFM image of the arbitrarily shaped 3D object that includes multiple bumps and dents. FIG. 7B shows SEM images of the object on which a metasurface skin cloak has been fabricated. The scale bar is 1 μm. The inset shows an enlarged image of the entire object, with a scale bar of 5 μm.

The fabrication process for the metasurface skin cloak in this Example began with forming a 1 μm thick oxidation layer ($SiO_2$) on a silicon substrate. A gallium-based focused ion beam was then used to form an arbitrary-shaped three-dimensional profile and pattern alignment marks. The oxidation layer functioned to trap and prevent the remnant gallium ions (implanted during the FIB milling process) from diffusing to the top surface and causing undesired roughness. This was followed by electron beam evaporation of a 200 nm thick layer of gold to form the bottom reflective layer. Next, an atomic force microscope was used to map out the height profile of the entire three-dimensional object. Using the height data as the input, this allows for the design and fabrication of a metasurface nanoantenna at each local position. An extra step of coordinate marking of the patterned alignment marks was also performed to further improve the alignment accuracy. Electron beam evaporation of a 50 nm thick $MgF_2$ layer was performed to create the dielectric spacer for the gap plasmon resonance. The metasurface nanoantennas were patterned on a bilayer poly (methyl methacrylate) (PMMA) resist using electron beam lithography with precise alignment. Upon development of the resist, a 2 nm chromium adhesion layer and a 30 nm gold layer were evaporated followed by a standard lift-off process.

Figure 7C:
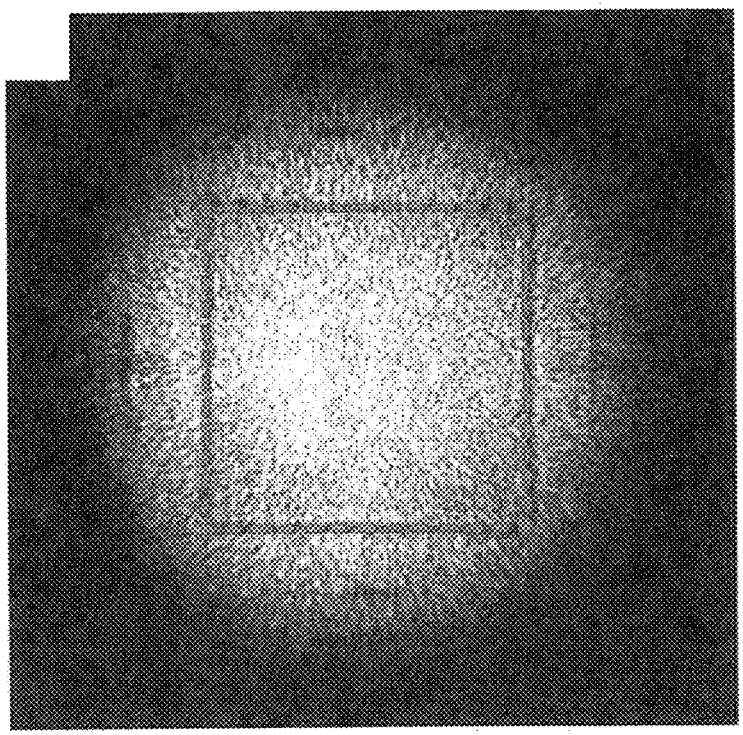
FIGS. 7C and 7D show optical widefield reflection images obtained with a 0.3 numerical aperture objective lens with 730 nm wavelength laser illumination when the cloak is on and off, respectively.
Figure 7D:
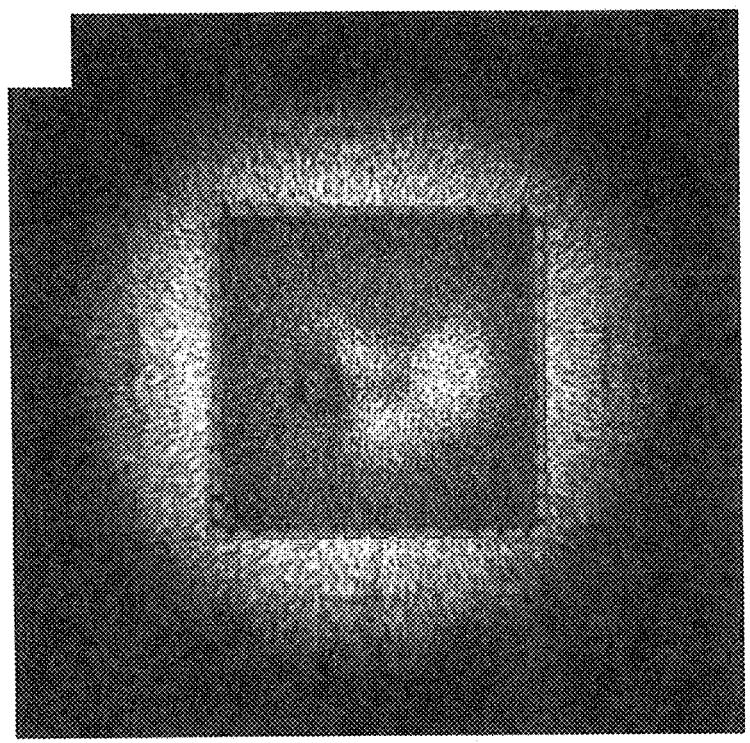

The nanoantennas were designed to have the correct phase shift only in the x polarization. This enabled the metasurface skin cloak to be turned on and off by switching the polarization. FIGS. 7C and 7D show optical widefield reflection images obtained with a 0.3 numerical aperture objective lens with 730 nm wavelength laser illumination when the cloak in on and off. The sample region is indicated by the dashed boxes. FIG. 7C was a reflection image obtained when the cloak was on. FIG. 7D was a reflection image obtained when the cloak was on. With the cloak off, a strong contrast between the cloaked region and the surrounding reflective surface revealed the object (FIG. 7D), but with the correct polarization, the contrast became indistinguishable, rendering the object completely invisible (FIG. 7C).

Figure 7E:
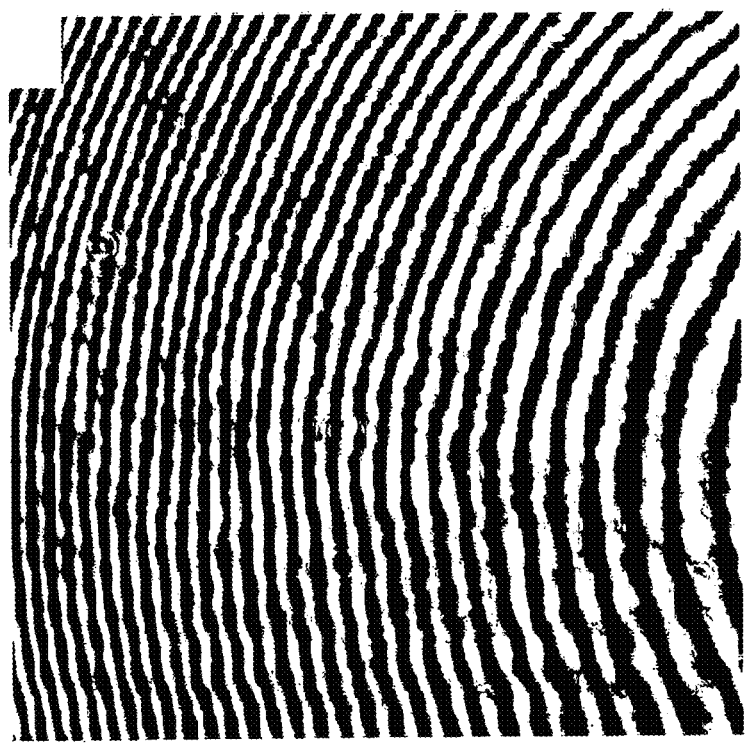
FIGS. 7E and 7F show interference images when the cloak is on and off, respectively.
Figure 7F:
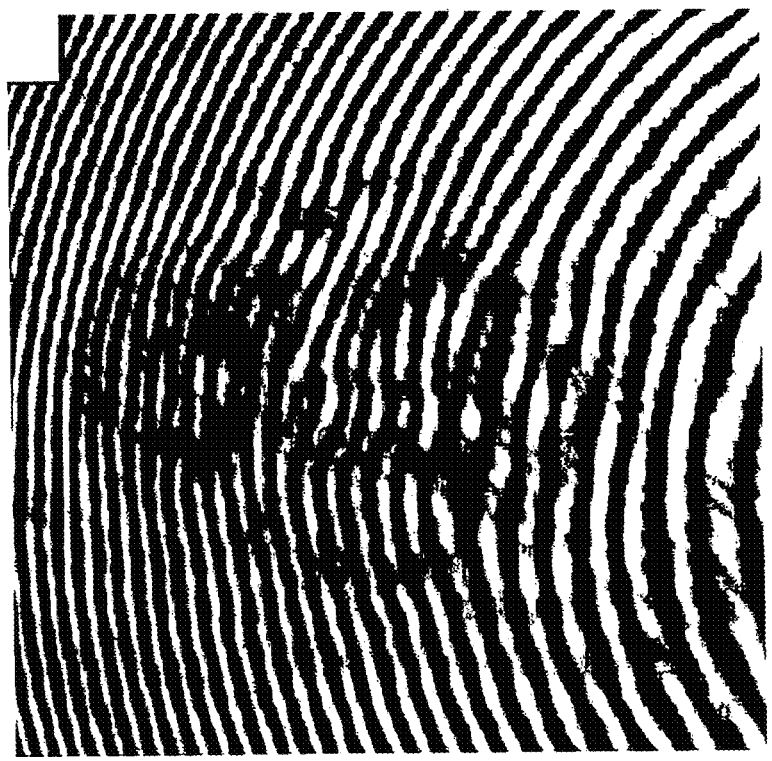

For the phase measurement, a customized Mach-Zehnder interferometer was built to obtain the reflected phase information from the sample. FIGS. 7E and 7F show interference images when the cloak is on and off. When the cloak is off (FIG. 7F), the interference fringes are distorted on the 3D object, indicating nonuniformity in the phase of the reflected light due to the scattering of the object (i.e., height difference at the surface). When the cloak is on (FIG. 7E), the interference fringes are smoothly aligned, indicating that the reflected phase was perfectly uniform over the surface and matching with that of the flat surface outside the object region. This shows showing that both the wavefront and the phase are well restored without any distortion with the metasurface skin cloak. Because an objective was used to image the sample, the interference fringes are rings rather than perfectly straight lines.

Figure 8A:
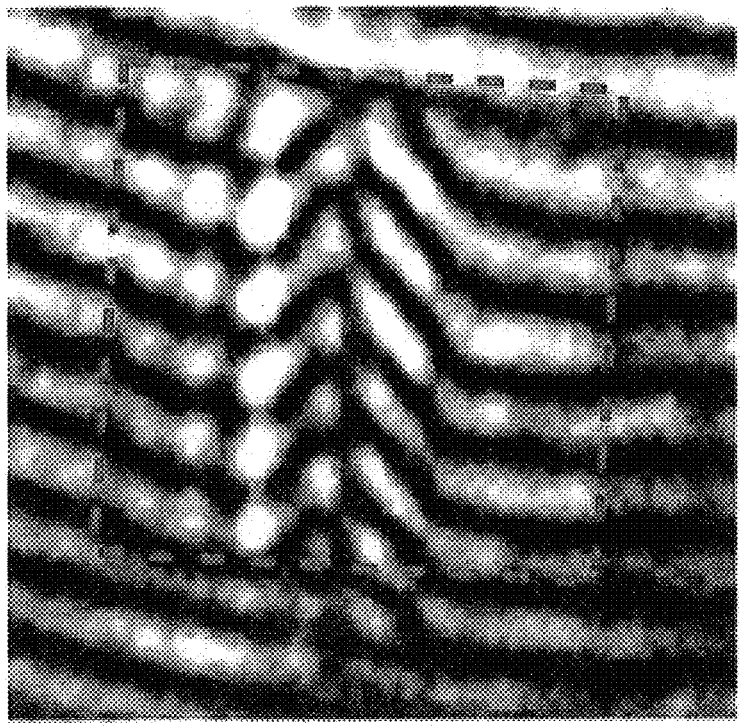
FIGS. 8A and 8B show interference fringes when the cloak is off and on, respectively.
Figure 8B:
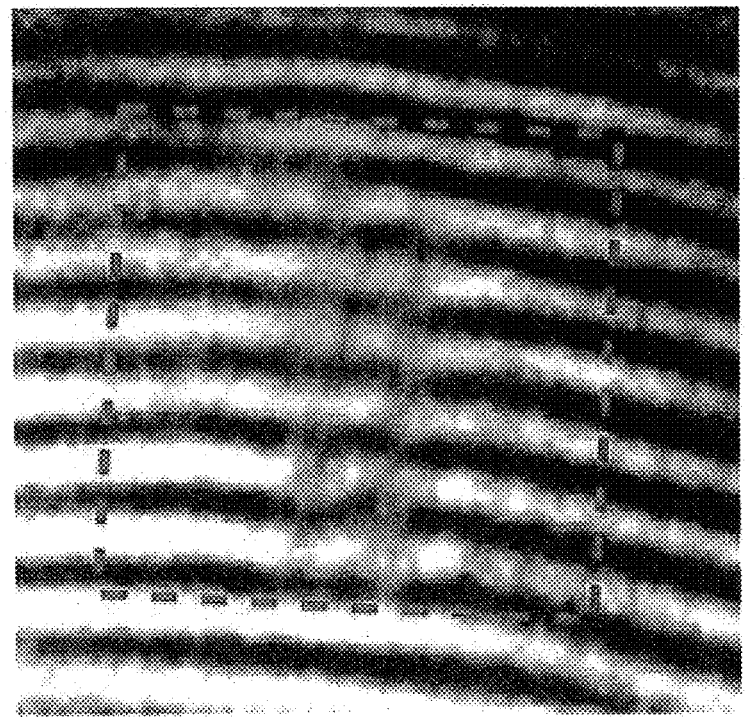
Figure 8C:
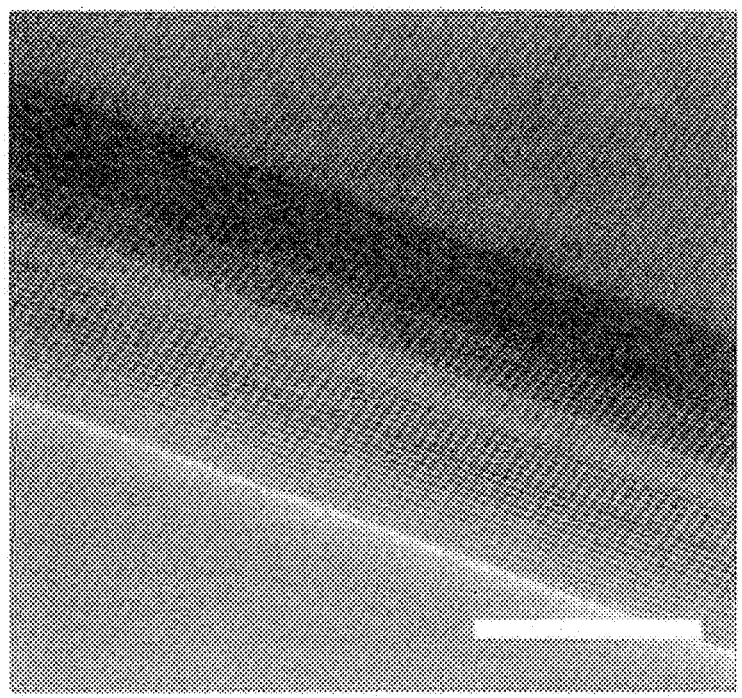
FIG. 8C shows a SEM image of the bump-shaped object with the metasurface skin cloak wrapped over it.

To quantify the performance of a metasurface skin cloak, a 3D bump-shaped object with a cloak disposed thereon was fabricated and measured. FIGS. 8A and 8B show interference fringes when the cloak is off and on, respectively. The sample regions are indicated by the dashed boxes. When the cloak was off (FIG. 8A), the interference fringes shifted in the direction perpendicular to the stripes. The extent of phase shift was approximately proportional to the local height of the bump surface. When the cloak was on (FIG. 8B), the interference fringes became smooth and realigned with those from the flat region. No phase jump was observed even at the edges of the skin cloak, proving that there was no additional phase introduced by the cloak. FIG. 8C shows a SEM image of the bump-shaped object with the metasurface skin cloak wrapped over it. The scale bar is 5 μm.

Figure 8D:
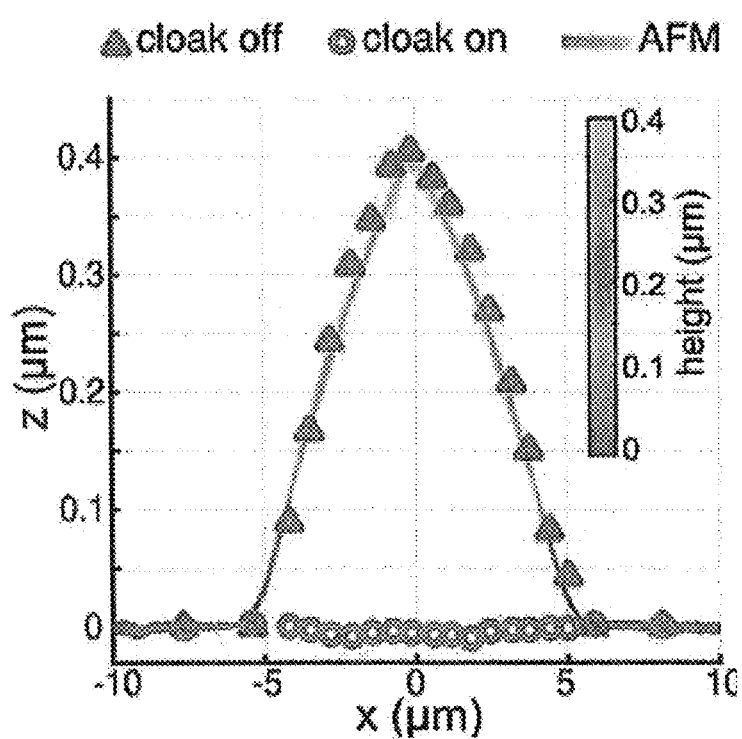
FIG. 8D shows the extracted height profile from the interference measurement (Δ for cloak off and O for cloak on) together with that from the AFM measurement (solid line) before fabrication of the nanoantennas.

FIG. 8D shows the extracted height profile from the interference measurement (Δ for cloak off and O for cloak on) together with that from the AFM measurement (solid line) before fabrication of the nanoantennas. The relative height information was extracted from the extent of fringe dislocation and compared with the AFM height profile measured before the nanoantennas were fabricated. When the skin cloak was off, the height from the interference measurement matched well with the AFM results, revealing the true bump profile. Thus, the bump could be precisely mapped out with the use of this phase-sensitive method. When the cloak was on, the extracted height notably dropped to zero over the entire area.

The experimental implementation of metasurface skin cloak described above is thin because the nanoantenna and dielectric thicknesses are 30 nm and 50 nm, respectively. With a total thickness of only about 1/10 of the operating wavelengths, the metasurface skin cloak is scalable to macroscopic sizes. In the experiments described above, the nanoantennas were fabricated on top of the object to demonstrate the capability of thin 3D cloaking of an arbitrary shape. The design tolerated incident angles at least within 30°. To allow easy switching between cloak on and cloak off configurations for direct comparison, the metasurface was designed to work only in one polarization. However, by making the nanoantenna shapes symmetric in both x and y directions, it would be possible to implement a polarization-independent invisibility skin cloak. Furthermore, if the nanoantennas could be made adaptive, passively or actively, a deformable skin cloak could potentially conceal any object.

CONCLUSION

Further details related to the embodiments described herein can be found in Ni et al., "An ultrathin invisibility skin cloak for visible light," Science, 18 Sep. 2015: Vol. 349 no. 6254 pp. 1310-1314, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
    a reflective layer disposed on a surface, the surface including a feature on the surface;
    a dielectric layer, the dielectric layer disposed on the reflective layer; and
    a plurality of blocks disposed on the dielectric layer, each block of the plurality of blocks having a shape that is symmetric about two perpendicular axes;
    a thickness of the dielectric layer and a thickness of the plurality of blocks being specified so that the reflectivity of the surface and the plurality of blocks for electromagnetic radiation is greater than about 85%, the electromagnetic radiation being a specified range of wavelengths of electromagnetic radiation, the dimensions of each block of the plurality of blocks being specified to have a reflectivity of the electromagnetic radiation that is the same as a reflectivity of the surface that each block of the plurality of blocks is overlying and dimensions of each block of the plurality of blocks being specified so that each block is operable to introduce a phase shift in the electromagnetic radiation that is reflected from the surface so that the phase of the reflected electromagnetic radiation is the same as if the reflected electromagnetic radiation were reflected from a flat surface not including the feature.

2. The device of claim 1, wherein each block of the plurality of blocks has dimensions selected from a set of three of more dimensions.

3. The device of claim 1, wherein the shape of each block of the plurality of blocks is selected from a group consisting of a square, a rectangle, a circle, and an ellipse.

4. The device of claim 1, wherein the shape of each block of the plurality of blocks is selected from a group consisting of a square and a rectangle, and wherein the square or rectangle has a length of about 10 nanometers to 300 nanometers and a width of about 10 nanometers to 300 nanometers.

5. The device of claim 1, wherein the dielectric layer comprises a dielectric selected from a group consisting of $MgF_2$, $SiO_2$, $GeO_2$, $Al_2O_3$, $TiO_2$, $HfO_2$, $TeO_2$, and $Si_3N_4$.

6. The device of claim 1, wherein the dielectric layer is about 10 nanometers to 100 nanometers thick.

7. The device of claim 1, wherein the plurality of blocks comprise a material selected from a group consisting of gold, silver, and aluminum.

8. The device of claim 1, wherein each block of the plurality of blocks is about 10 nanometers to 80 nanometers thick.

9. The device of claim 1, wherein the reflective layer comprises a material selected from a group consisting of gold, silver, aluminum, titanium, and chromium.

10. The device of claim 1, wherein the reflective layer is at least about 50 nanometers thick.

11. The device of claim 1, wherein each block of the plurality of blocks has a spacing of at least about 60 nanometers from each other block of the plurality of blocks.

12. The device of claim 1, wherein a thickness of each block of the plurality of blocks is the same for each block of the plurality of blocks.

13. A method comprising:
    (a) depositing a reflective layer on a surface, the surface including a feature;
    (b) measuring a two dimensional height profile of the surface;
    (c) determining a thickness of a dielectric layer and a thickness of a plurality of blocks disposed thereon so that the surface with the plurality of blocks disposed thereon has a reflectivity of at least about 85% for electromagnetic radiation, the electromagnetic radiation being a specified range of wavelengths of electromagnetic radiation;
    (d) determining dimensions of each block of the plurality of blocks needed to introduce a phase shift in the electromagnetic radiation that is reflected from the surface so that the phase of the reflected electromagnetic radiation is the same as if the reflected electromagnetic radiation were reflected from a flat surface not including the feature;
    (e) determining the dimensions of each block of the plurality of blocks needed to have a reflectivity of the electromagnetic radiation that is the same as a reflectivity of the surface that each block of the plurality of blocks is overlying so that the reflected electromagnetic radiation has the same amplitude;
    (f) depositing the dielectric layer on the reflective layer having the thickness determined in operation (c);
    (g) depositing a material having a thickness determined in operation (c) on the dielectric layer; and
    (h) removing portions of the material to form the plurality of blocks having the dimensions determined in operation (d) and (e), each block of the plurality of blocks having a shape that is symmetric about two perpendicular axes.

14. A method comprising:
    (a) depositing a reflective layer on a surface, the surface including a feature;
    (b) measuring a two dimensional height profile of the surface;
    (c) determining a thickness of a dielectric layer and a thickness of a plurality of blocks disposed thereon so that the surface with the plurality of blocks disposed thereon has a reflectivity of at least about 85% for electromagnetic radiation, the electromagnetic radiation being a specified range of wavelengths of electromagnetic radiation;
    (d) determining dimensions of each block of the plurality of blocks needed to introduce a phase shift in the electromagnetic radiation that is reflected from the surface so that the phase of the reflected electromagnetic radiation is the same as if the reflected electromagnetic radiation were reflected from a flat surface not including the feature;
    (e) determining the dimensions of each block of the plurality of blocks needed to have a reflectivity of the electromagnetic radiation that is the same as a reflectivity of the surface that each block of the plurality of blocks is overlying so that the reflected electromagnetic radiation has the same amplitude;
    (f) depositing the dielectric layer having the thickness determined in operation (c) on the reflective layer; and
    (g) forming the plurality of blocks on the dielectric layer, the plurality of blocks having the thickness determined in operation (c), each block of the plurality of blocks having dimensions as determined in operations (d) and (e), each block of the plurality of blocks having a shape that is symmetric about two perpendicular axes.

15. The method of claim 13, wherein the plurality of blocks comprise a material selected from a group consisting of gold, silver, and aluminum.

16. The method of claim 13, wherein the reflective layer comprises a material selected from a group consisting of gold, silver, aluminum, titanium, and chromium.

17. The method of claim 13, wherein the reflective layer is at least about 50 nanometers thick.

18. The method of claim 14, wherein the plurality of blocks comprise a material selected from a group consisting of gold, silver, and aluminum.

19. The method of claim 14, wherein the reflective layer comprises a material selected from a group consisting of gold, silver, aluminum, titanium, and chromium.

20. The method of claim 14, wherein the reflective layer is at least about 50 nanometers thick.

* * * * *